(12) United States Patent
Campbell et al.

(10) Patent No.: US 8,810,359 B2
(45) Date of Patent: Aug. 19, 2014

(54) ASSEMBLING AND CONTROLLING LIGHT UNIT ARRAYS

(75) Inventors: Gregory Campbell, Walpole, MA (US); Francois-Xavier Souvay, Boucherville (CA); Yvan Hamel, Laval (CA)

(73) Assignee: Lumenpulse Lighting, Inc. (CA)

( * ) Notice: Subject to any disclaimer, the term of this patent is extended or adjusted under 35 U.S.C. 154(b) by 79 days.

(21) Appl. No.: 13/328,687

(22) Filed: Dec. 16, 2011

(65) Prior Publication Data

US 2012/0133303 A1    May 31, 2012

Related U.S. Application Data

(63) Continuation-in-part of application No. PCT/US2011/041426, filed on Jun. 22, 2011.

(60) Provisional application No. 61/357,733, filed on Jun. 23, 2010.

(51) Int. Cl.
| | | |
|---|---|---|
| H04L 7/00 | (2006.01) | |
| G05B 19/02 | (2006.01) | |
| G08B 21/00 | (2006.01) | |
| F21S 8/00 | (2006.01) | |
| B60Q 1/124 | (2006.01) | |
| H04W 4/04 | (2009.01) | |
| H05B 37/02 | (2006.01) | |

(52) U.S. Cl.
CPC ............ *H05B 37/0245* (2013.01); *H04W 4/04* (2013.01); *H04W 4/043* (2013.01)
USPC ........ 340/4.21; 340/4.3; 340/686.6; 362/147; 362/233

(58) Field of Classification Search
USPC ....................................................... 340/4.21
See application file for complete search history.

(56) References Cited

U.S. PATENT DOCUMENTS

| 5,209,560 A | 5/1993 | Taylor et al. |
|---|---|---|
| 6,608,453 B2 | 8/2003 | Morgan et al. |

(Continued)

FOREIGN PATENT DOCUMENTS

| JP | 00009102396 | 4/1997 |
|---|---|---|
| JP | 2000048968 | 2/2000 |

(Continued)

OTHER PUBLICATIONS

International Search Report and Written Opinion, International Application No. PCT/US2011/041426, International Filing Date Jun. 22, 2011, document dated Feb. 17, 2012, 8 pages.

*Primary Examiner* — Kerri McNally
*Assistant Examiner* — John Mortell
(74) *Attorney, Agent, or Firm* — Burns & Levinson LLP; Joseph M. Maraia

(57) ABSTRACT

A method and a system for assembling and controlling a lighting array including a plurality of lighting units by providing a representation of the lighting array having a unit entry for and corresponding to each lighting unit in the lighting array wherein each unit entry includes a physical location address field and a lighting unit identification field. The representation of the lighting array is mapped onto the array address space by entering a physical address in the array address space into the location address field of each unit entry and serializing the lighting unit by writing a unique unit identifier of a corresponding lighting unit into the lighting unit identification field of each unit entry.

20 Claims, 10 Drawing Sheets

(56) References Cited

U.S. PATENT DOCUMENTS

| | | | |
|---|---|---|---|
| 6,777,891 B2 | 8/2004 | Lys et al. | |
| 7,204,622 B2 | 4/2007 | Dowling et al. | |
| 7,495,671 B2 * | 2/2009 | Chemel et al. | 345/594 |
| 7,605,547 B2 | 10/2009 | Ng | |
| 7,781,979 B2 | 8/2010 | Lys | |
| 7,911,359 B2 | 3/2011 | Walters et al. | |
| 7,961,113 B2 | 6/2011 | Rabiner et al. | |
| 2010/0231404 A1 * | 9/2010 | Duine et al. | 340/686.6 |

FOREIGN PATENT DOCUMENTS

| | | |
|---|---|---|
| JP | 2003045678 | 2/2003 |
| JP | 2007504617 | 3/2007 |
| KR | 20080026126 | 3/2008 |
| WO | 2005/025277 A1 | 3/2005 |
| WO | 2006/129227 A2 | 12/2006 |

* cited by examiner

| Physical Location 234L Array Address Space 236A Addressable Light 122a | Physical Location 234L Array Address Space 236A Addressable Light 122b | ... | Physical Location 234L Array Address Space 236A Addressable Light 122f |
|---|---|---|---|
| Physical Location 234L Array Address Space 236A Addressable Light 112a | Physical Location 234L Array Address Space 236A Addressable Light 112b | ... | Physical Location 234L Array Address Space 236A Addressable Light 112z |
| Physical Location 234L Array Address Space 236A Addressable Light 192a | Physical Location 234L Array Address Space 236A Addressable Light 192b | ... | Physical Location 234L Array Address Space 236A Addressable Light 192j |

Array Address Space 236

Display Space 234

FIG. 2E

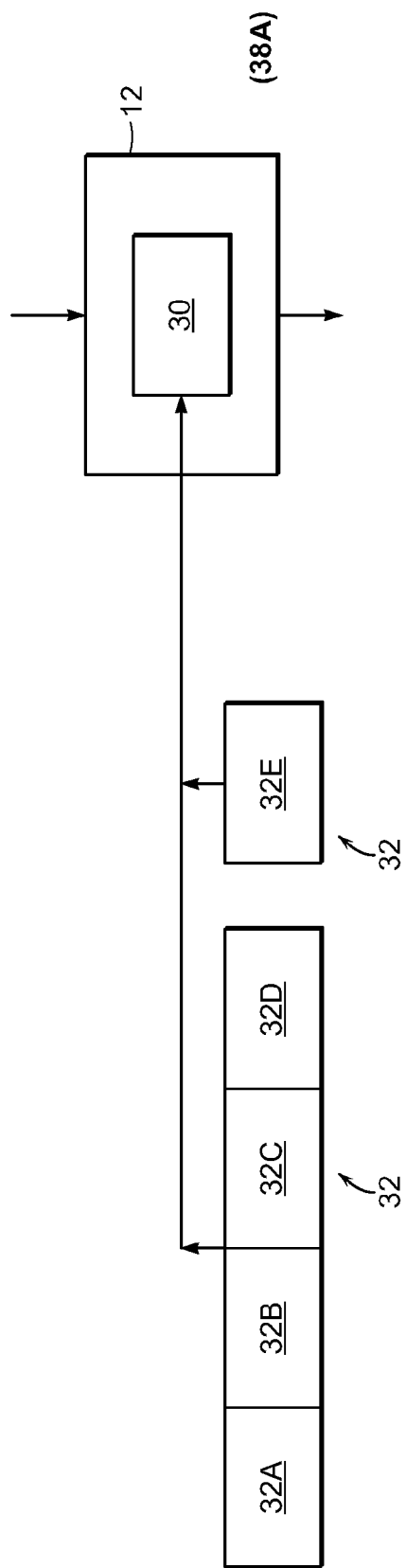

ASSEMBLING AND CONTROLLING LIGHT UNIT ARRAYS

RELATED APPLICATION

This application is a continuation-in-part of International Application No. PCT/US11/41426, which designated the United States, and was filed on Jun. 22, 2011, which claims priority to U.S. Provisional Patent Application No. 61/357,733, filed on Jun. 23, 2010. The entire teachings of the above applications are incorporated herein by reference.

FIELD OF THE INVENTION

The present invention relates to a method and a system for planning, installing, managing and controlling an array of lighting elements and, in particular, an array of high power dynamically programmable single or multiple color light emitting diode (LED) lighting units for large scale lighting functions, such as architectural lighting and the like.

BACKGROUND OF THE INVENTION

Developments in LED technology have resulted in the development of "high powered" LEDs having light outputs on the order of, for example, 70 to 80 lumens per watt, so that lighting units comprised of arrays of high powered LEDs have proven practical and suitable for high powered indoor and outdoor lighting functions, such as architectural lighting. Such high powered LED lighting units may comprise arrays of selected combinations of red, green and blue LEDs and white LEDs having different color temperatures and the color or color temperature outputs of such LED array units may be controlled so that the relative illumination level outputs of the individual LEDs, in the array, combine to provide the desired color or color temperature for the lighting unit output. The individual LED lighting units are available in a wide range of illumination distribution configurations, such as spot, flood and linear distributions, and of various sizes and power levels. As a result, the arrays or the configurations of variously configured LED lighting units may provide virtually any desired lighting function or illumination distribution.

A recurring problem with such architectural lighting arrays, however, is the planning, installation, management and/or control of the array of the lighting elements, particularly given the variety of types and configurations of LED lighting units currently available. It will be appreciated that these problems increase significantly with the size and complexity of the lighting arrays and with such factors as the dynamic control of the architectural lighting displays to provide lighting effects that vary with time.

The present invention provides a solution to these and related problems associated with the prior art.

SUMMARY OF THE INVENTION

The present invention is directed to a method and a system for assembling and controlling a lighting array including a plurality of lighting units for the lighting of a display space.

One approach to a light array management is a system that includes a lighting unit interrogation module configured to receive unit identifiers from a plurality of lighting units. Each unit identifier includes data indicating a plurality of addressable lights for the respective lighting unit. The system further includes a lighting unit mapping module configured to sequentially map the data of the addressable lights for each of the plurality of lighting units to an array address space. The system further includes a lighting unit serialization module configured to serialize the array address space for the plurality of lighting units based on the sequentially mapping of the data of the addressable lights and a specific location of each of the lighting units.

Another approach to a light array management is a lighting unit that includes a plurality of addressable lights. The lighting unit further includes a controller configured to transmit an unit identifier to a light array management system, the unit identifier comprises data indicating a plurality of addressable lights for the lighting unit, and control one or more of the plurality of addressable lights based on a control command, the control command comprises a command code to operate the one or more of the plurality of addressable lights.

Another approach to a light array management is a method that includes receiving unit identifiers from a plurality of lighting units, each unit identifier includes data indicating a plurality of addressable lights for the respective lighting unit; sequentially mapping the data of the addressable lights for each of the plurality of lighting units to an array address space; and serializing the array address space for the plurality of lighting units based on the sequentially mapping of the data of the addressable lights and a specific location of each of the lighting units.

Another approach to a light array management is a method that includes providing a representation of the lighting array, the representation of the lighting array identifying a type of lighting unit to be associated with each physical location of a lighting unit in an array address space having a physical address location for each lighting unit in the lighting array wherein there is a unit entry for and corresponding to each lighting unit in the lighting array. Each unit entry includes a location address field for storing a physical address of a corresponding lighting unit and a lighting unit identification field for storing a unique unit identifier of a lighting unit assigned to the corresponding physical address in the array address space.

The representation of the lighting array is then mapped onto the array address space by entering a physical address of a corresponding physical location in the array address space into the location address field of each unit entry corresponding to a lighting unit in the lighting array, and the lighting units of the array are then serialized to associate a specific lighting unit with each physical location of a lighting unit in the array address space by writing the unique unit identifier of a corresponding lighting unit into the lighting unit identification field of each unit entry corresponding to a lighting unit in the lighting array.

Any of the approaches described herein can include one or more of the following examples.

In some examples, each unique unit identifier includes at least one of a product code identifying a type of the lighting unit, at least one identifier of at least one light emission characteristic of the lighting unit, at least one dimension of the lighting unit, an identifier of control codes for the lighting unit, and a lighting configuration code identifying a type of light distribution generated by the lighting unit.

In other examples, the physical addresses of the array address space include either physical locations occupied by the lighting units or all physical locations for the lighting unit in the array address space.

In some examples, when at least one of the physical locations in the lighting array is occupied by a lighting unit, the step of serializing the lighting units of the lighting array may further include at least either obtaining unique identifier data of a lighting unit occupying at least one of the lighting unit physical locations in the lighting array from an array data structure for storing unique identifier data of lighting units occupying physical locations of the lighting array, or reading unique identifier data of a lighting unit occupying a physical location in the lighting array from the lighting unit occupying the physical location.

In other examples, when at least one lighting unit is to be installed in at least one of the physical locations in the lighting array, the step of serializing the lighting units of the lighting array may further include obtaining unique identifier data of a lighting unit in an inventory of lighting unit from an inventory data structure for storing unique identifier data of the lighting units in the inventory, or reading unique identifier data of the lighting unit from the lighting unit stored in an inventory of the lighting units.

In some examples, the method for assembling and controlling a lighting array may also include the step of comparing the unique identifier data obtained from one of the inventory data structure and the lighting unit stored in an inventory of the lighting units with unique identifier data specified for the at least one lighting unit to be installed in a physical location of the lighting array to identify a specific lighting array from the inventory of the lighting units corresponding to the specified unique identifier data.

In other examples, each unit identifier is received from a controller of the lighting unit.

In some examples, the system further includes a lighting unit controller module configured to transmit a control command to a controller of one of the plurality of lighting units. The control command includes a command code to operate one or more of the addressable lights of the one of the plurality of lighting units.

In other examples, the specific location of each of the lighting units comprises a physical location of the respective lighting unit in a structure.

In some examples, the system further includes the lighting unit mapping module further configured to assign sequential addresses to the addressable lights for each of the plurality of lighting units in the array address space; and sequentially order the assigned sequential addresses of the addressable lights for each of the plurality of lighting units in the array address space.

In other examples, the system further includes a lighting unit identification module further configured to associate a unique unit identifier for each of the plurality of lighting units in the array address space.

In some examples, the unique unit identifier includes a product code identifying a type of the lighting unit, at least one identifier of at least one light emission characteristic of the lighting unit, at least one dimension of the lighting unit, an identifier of control codes for the lighting unit, a lighting configuration code identifying a type of light distribution generated by the lighting unit, or any combination thereof.

In other examples, the method further includes receiving unit identifier from a controller of each of the plurality of lighting units.

In some examples, the method further includes transmitting a control command to a controller of one of the plurality of lighting units. The control command includes a command code to operate one or more of the addressable lights of the one of the plurality of lighting units.

In other examples, the specific location of each of the lighting units includes a physical location of the respective lighting unit in a structure.

In some examples, the method further includes assigning sequential addresses to the addressable lights for each of the plurality of lighting units in the array address space; and sequentially ordering the assigned sequential addresses of the addressable lights for each of the plurality of lighting units in the array address space.

In other examples, the method further includes associating a unique unit identifier for each of the plurality of lighting units in the array address space.

In some examples, the unique unit identifier includes a product code identifying a type of the lighting unit, at least one identifier of at least one light emission characteristic of the lighting unit, at least one dimension of the lighting unit, an identifier of control codes for the lighting unit, a lighting configuration code identifying a type of light distribution generated by the lighting unit, or any combination thereof.

The light array management systems and methods described herein (hereinafter "technology") can provide one or more of the following advantages. An advantage of the technology is a plurality of addressable lights in a lighting array can be controlled and configured via a single controller, thereby reducing installation costs and management costs for the lighting array. Another advantage of the technology is that identifiers for control of a plurality of addressable lights can be automatically assigned, thereby decreasing installation time and increasing the pay-back time for installation of a lighting array.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 2E is another diagrammatic block diagram of another lighting array in another exemplary address space of a display space;

FIG. 3A is a diagrammatic illustration of the step of assigning a unique identifier to a lighting unit;

DETAILED DESCRIPTION OF THE INVENTION

Light unit array assembly and control, generally, includes technology that generates an array address space for control of particular lights within a light array. The light array can be utilized in and/or on a structure (e.g., building, ship, interior entranceway, etc.) for lighting and/or decorative purposes and can include a plurality of lighting units. The array address space can be utilized to control addressable lights in the lighting units (e.g., control color output of an addressable light illuminating a painting, control light output of addressable lights illuminating a stairwell, etc.). The technology advantageously decreases installation time for light arrays by decreasing the time required to program the light arrays during commissioning of the light arrays. The technology advantageously increases the effective uses of the light arrays by enabling efficiency control of the individual lights within light units in the light array through automatic sequential mapping of the lights in each light unit.

In operation, for example, an outside of a building includes ten lighting units with fifteen addressable lights in each lighting unit (in this example, one hundred and fifty addressable lights). The technology receives data from each of the lighting units and the received data includes a number of addressable lights with the respective lighting unit along with other unique unit identifying information for use in the control of the lights. The technology generates an array address space that provides a mapping of the addressable lights to the physical location (e.g., the physical location where each addressable light within a building is installed). The technology can utilize the array address space to control the addressable lights (e.g., adjust the output of all outside building lights to 25% output in the physically installed order instead of the address order, modify the color output of all interior office lights to natural outside light, modify the color temperature of a row of lights illuminating a particular painting, etc.), thereby enabling control of a plurality of addressable through a minimum number of controllers, which reduces the installation and maintenance costs of the light array.

Figure 1:
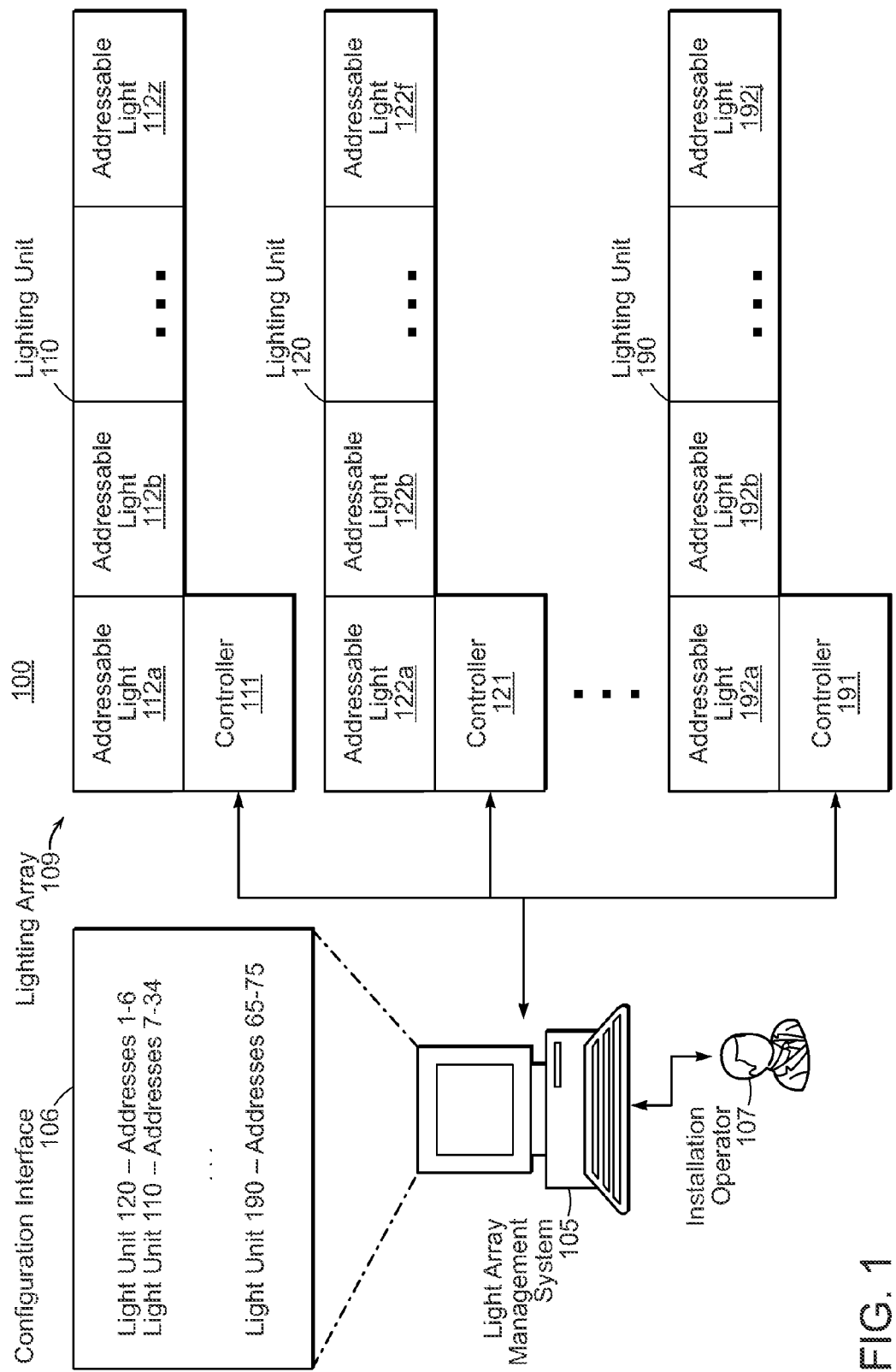
FIG. 1 is a diagrammatic block diagram of a light unit array environment.

FIG. 1 is a diagrammatic block diagram of a light unit array environment 100. The environment 100 includes a light array management system 105 and a lighting array 109. The lighting array 109 includes a plurality of lighting units 110, 120 through 190. Each lighting unit 110, 120 through 190 includes a controller 111, 121 through 191, respectively, and a plurality of addressable lights. The lighting unit 110 includes addressable lights 112a, 112b through 112z. The light unit 120 includes addressable lights 122a, 122b through 122f. The lighting unit 190 includes addressable lights 192a, 192b through 192j. The controller 111, 121 through 191 for each lighting unit 110, 120 through 190 controls the respective plurality of addressable lights.

An installation operator 107 utilizes a configuration interface 106 via the light array management system 105 to transmit a request to the plurality of lighting units 110, 120 through 190 for unit identifiers from each of the plurality of lighting units 110, 120 through 190. The controller 111, 121 through 191 for each of the lighting units 110, 120 through 190, respectively, responds to the request and transmits the unit identifier for the lighting unit 110, 120 through 190. Each of the unit identifiers includes data indicating the plurality of addressable lights for the respective lighting unit. The automatic response of the lighting units enables the technology to quickly and accurately identify the lighting units in a physical location, thereby decreasing the installation cost of the lighting units and decreasing the cost for re-configuration of the lighting units (e.g., remove a lighting unit, add a lighting unit, move a lighting unit, etc.).

As illustrated in FIG. 1, the lighting unit 110 includes twenty six addressable lights—addressable lights 112a, 112b through 112z—and the unit identifier transmitted by the controller 111 includes the information that the controller 111 controls the twenty six addressable lights and the addresses of the twenty six addressable lights (e.g., physical network address, logical network addresses within the light unit, etc.). As illustrated in FIG. 1, the lighting unit 120 includes six addressable lights—addressable lights 122a, 122b through 122f—and the unit identifier transmitted by the controller 121 includes the information that the controller 111 controls the six addressable lights and the addresses of the six addressable lights. As illustrated in FIG. 1, the lighting unit 190 includes ten addressable lights—addressable lights 192a, 192b through 192j—and the unit identifier transmitted by the controller 191 includes the information that the controller 191 controls the ten addressable lights and the addresses of the ten addressable lights.

The light array management system 105 sequentially maps the data of the addressable lights for each of the plurality of lighting units 110, 120 through 190 to an array address space (e.g., a table, a linked list, an array, etc.). Table 1 illustrates an exemplary sequential mapping of the data to an array address space. In this example, the addressable lights are sequentially mapped in an array based on the received data and the addressable lights are assigned individual data fields in the array since each addressable light can advantageously be individually provisioned and controlled by the technology. The individual provisioning and control of the addressable lights advantageously increases the effective uses of the technology by enabling specialized control of the lighting array.

TABLE 1

Exemplary Sequential Mapping

| Addressable Light 112a | Addressable Light 112b | Addressable Light 112c (not shown) | Addressable Light 112d (not shown) | Addressable Light 112e (not shown) | Addressable Light 112f (not shown) |
|---|---|---|---|---|---|
| ... | ... | ... | ... | ... | ... |
| Addressable Light 112y (not shown) | Addressable Light 112z | | | | |
| Addressable Light 122a | Addressable Light 122b | Addressable Light 122c (not shown) | Addressable Light 122d (not shown) | Addressable Light 122e (not shown) | Addressable Light 122f |
| Addressable Light 192a | Addressable Light 192b | Addressable Light 192c (not shown) | Addressable Light 192d (not shown) | Addressable Light 192e (not shown) | Addressable Light 192f (not shown) |
| Addressable Light 192g (not shown) | Addressable Light 192h (not shown) | Addressable Light 192i (not shown) | Addressable Light 192j | | |

The light array management system 105 serializes the array address space for the plurality of lighting units 110, 120 through 190 based on the sequentially mapping of the data of the addressable lights and a specific location of each of the lighting units 110, 120 through 190. For example, the light array management system 105 re-arranges the array address space to match the array address space to the physical layout of the lighting array. Table 2 illustrates an exemplary serialization of the array address space to a physical layout of the lighting array (in this example, the physical layout is a side of a building). In this example, the addressable lights are individually addressable and controllable based on the physical layout of the lighting array, thereby increasing the effective uses of the lighting array by allowing finite control of the individual addressable lights in the lighting array (e.g., the addressable lights can be controlled to form a letter, the addressable lights can be controlled to be brighter on top than on bottom, etc.).

TABLE 2

Exemplary Serialization

| Rows | Outside Wall Column A | Outside Wall Column B | Outside Wall Column C | Outside Wall Column D | Outside Wall Column E | Outside Wall Column F |
|---|---|---|---|---|---|---|
| A1 | Addressable Light 122a | Addressable Light 122b | Addressable Light 122c (not shown) | Addressable Light 122d (not shown) | Addressable Light 122e (not shown) | Addressable Light 122f |
| A2 | Addressable Light 112a | Addressable Light 112b | Addressable Light 112c (not shown) | Addressable Light 112d (not shown) | Addressable Light 112e (not shown) | Addressable Light 112f (not shown) |
| A3 | Addressable Light 112g (not shown) | Addressable Light 112h (not shown) | Addressable Light 112i (not shown) | Addressable Light 112j (not shown) | Addressable Light 112k (not shown) | Addressable Light 112l (not shown) |
| A4 | Addressable Light 112m (not shown) | Addressable Light 112n (not shown) | Addressable Light 112o (not shown) | Addressable Light 112p (not shown) | Addressable Light 112q (not shown) | Addressable Light 112r (not shown) |
| A5 | Addressable Light 112s (not shown) | Addressable Light 112t (not shown) | Addressable Light 112u (not shown) | Addressable Light 112v (not shown) | Addressable Light 112w (not shown) | Addressable Light 112x (not shown) |
| A6 | Addressable Light 112y (not shown) | Addressable Light 112z | Addressable Light 192a | Addressable Light 192b | Addressable Light 192c (not shown) | Addressable Light 192d (not shown) |
| A7 | Addressable Light 192e (not shown) | Addressable Light 192f (not shown) | Addressable Light 192g (not shown) | Addressable Light 192h (not shown) | Addressable Light 192i (not shown) | Addressable Light 192j |

Figure 2A:
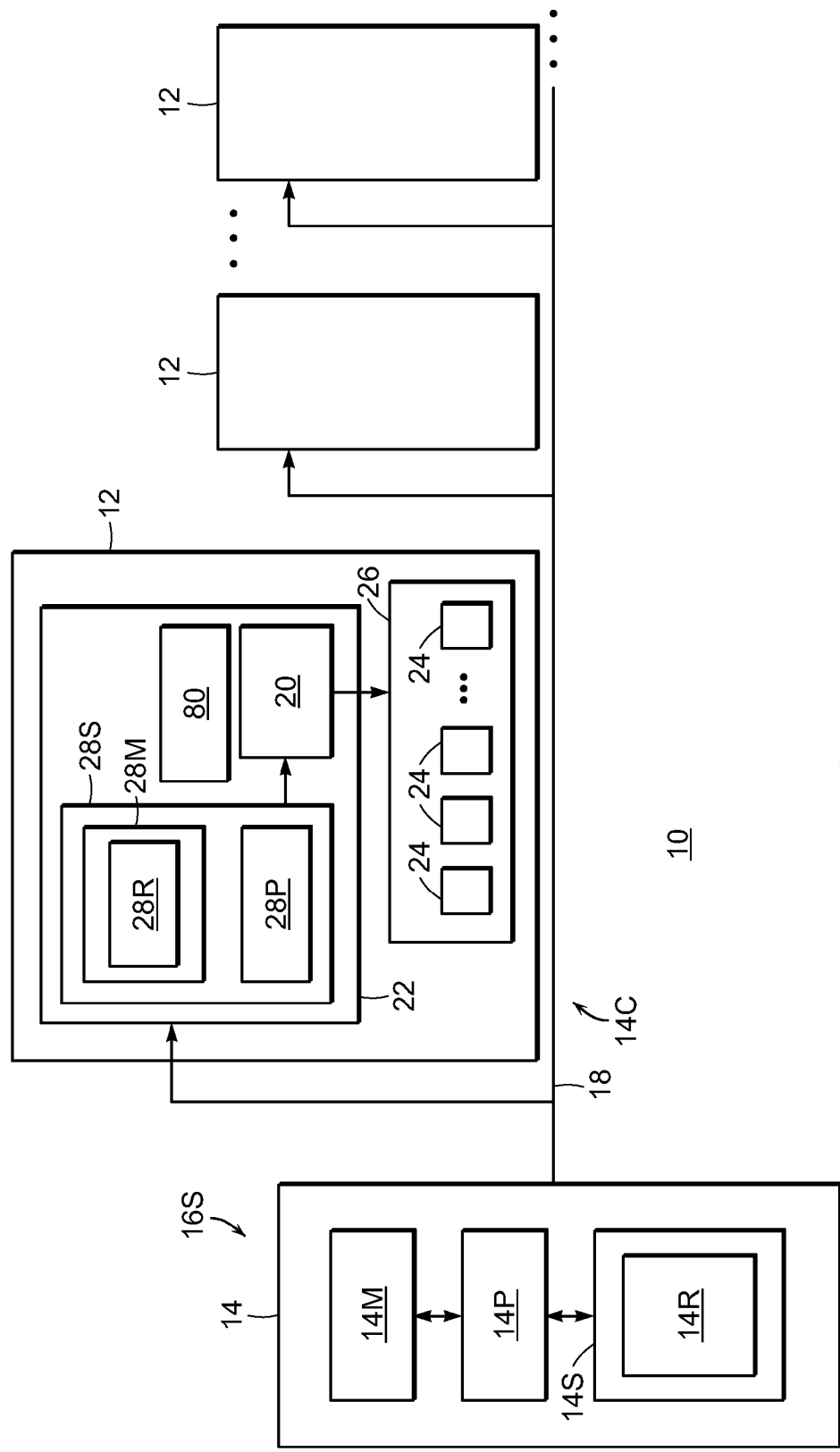
FIG. 2A is a diagrammatic block diagram of a lighting array with an array control system.

Referring first to FIG. 2A, a generalized, exemplary block diagram of a LED unit lighting array 10 is shown therein which comprises of a plurality of lighting units 12 that are monitored and controlled by an array control system 14.

As represented, an array management system 14 may, and for example, typically and generally comprise a processor 14P, an associated memory 14M, a mass storage device 14S and one or more programs 14R implementing a lighting array management system 16S of the present invention and controlling the lighting array 10 by the transmission of the unit control commands 14C transmitted according to, for example, industry standard lighting array control protocols such as the industry standard DMX512 protocol, the DALI protocol, the digital signal interface (DSI), or the remote device management (RDM) protocol, to the lighting units 12 via the system control cabling 18.

As generally represented in the expanded block diagram of an exemplary one of the lighting units 12 of the lighting array 10 of FIG. 2A, each lighting unit 12 typically includes a power supply unit 20 for providing power under the control of control circuits 22 to the plurality of LEDs 24 of the LED array 26 which comprises, for example, a selected combination or combinations of red, green and blue LEDs 24 and white LEDs 24 having different color temperatures. The control circuits 22 are, in turn, controlled by the control commands 14C transmitted by the array control system 14 and executed by a lighting unit control system 28S implemented in, for example, a unit processor 28P, a unit memory 28M and lighting unit control programs 28R of the lighting unit 12.

Figure 2B:
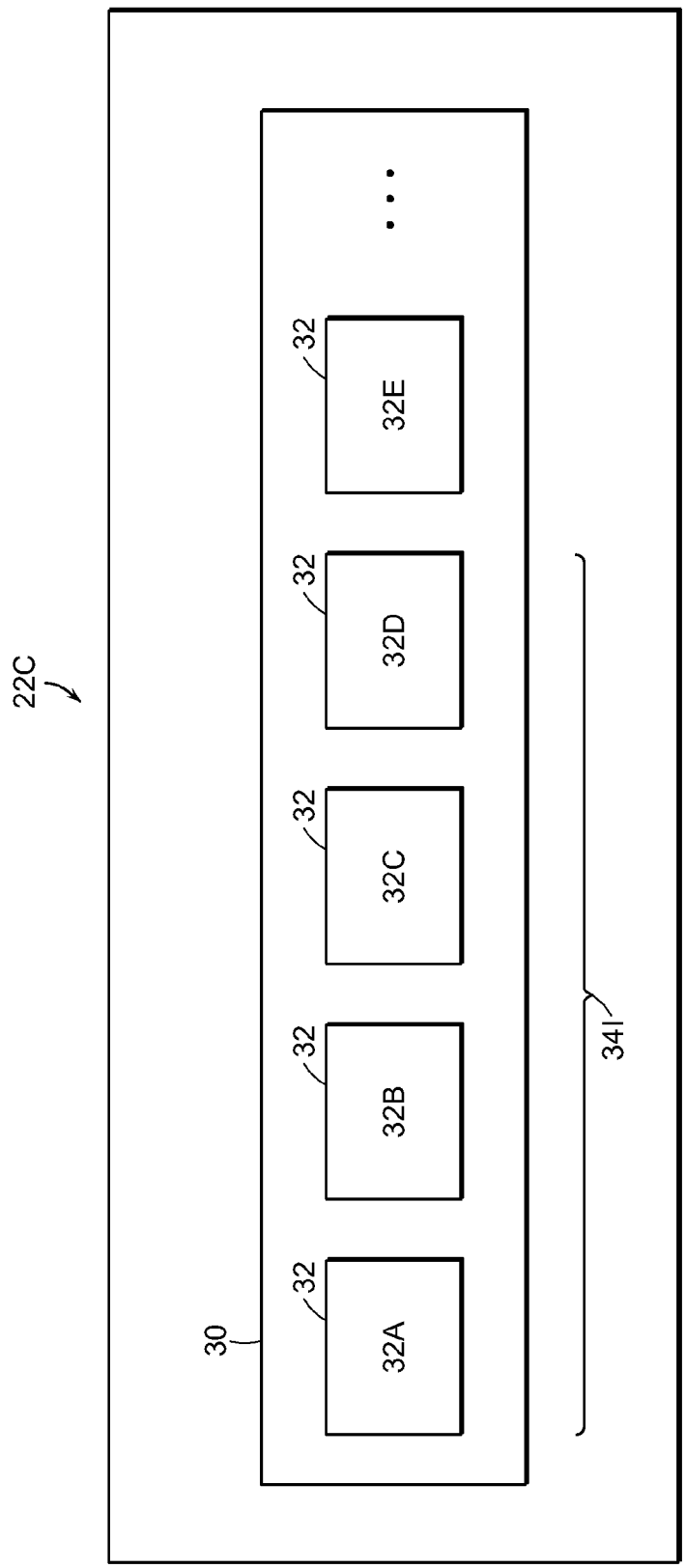
FIG. 2B is a diagram of a unique unit identifier.

According to the present invention, and as described in further detail in following description, each of the lighting unit 12 stores and includes a unique unit identifier 30 that contains and comprises of data fields 32 specifying the characteristics of and uniquely identifying the lighting unit 12. According to the present invention, the unique unit identifier 32 for each given lighting unit 12 is written into and permanently stored in the lighting unit 12 during manufacture of the specific lighting unit 12. The data fields 32 may include, for example and as generally illustrated in FIG. 2B, a product code 32A identifying the type of lighting unit 12, one or more unit characteristic identifiers 32B identifying various characteristics of the lighting unit 12 such as the white LED light temperature(s) and the number of red, green and blue LEDs 24 of the LED array 26 and the dimensions of the lighting unit 12, such as the length of the lighting unit 12, a data code identifier 32C identifying, for example, the number of bits expected in the control codes for the lighting unit 12, a lighting configuration code 32D identifying the type of light distribution to be generated by the lighting unit 12, and a serial number 32E that is unique to the lighting unit 12 and thus uniquely identifies the specific lighting unit 12. The unique unit identifier 30 of each lighting unit 12 may be stored, for example, in a non-volatile memory in the circuitry of the lighting unit 12 or, for example, the unique unit identifier 30 of each lighting unit 12 may also or alternately be stored in, for example, a radio frequency identifier (RFID) chip 22C.

Figure 2C:
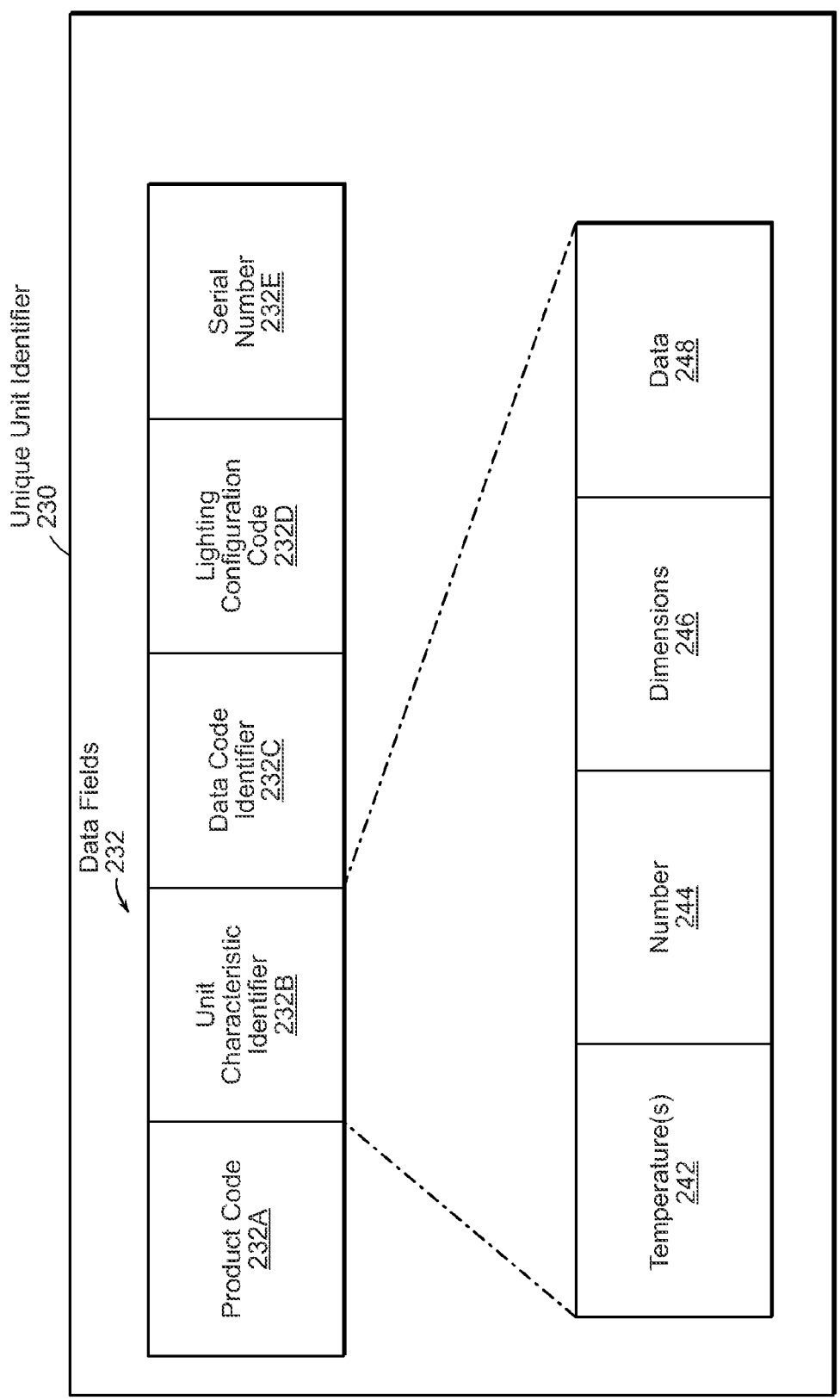
FIG. 2C is a diagrammatic block diagram of a lighting array in an address space of a display space.

In other examples, data fields 232 may include, for example and as generally illustrated in FIG. 2C, a product code 232A identifying the type of lighting unit 12 of FIG. 2A, one or more unit characteristic identifiers 232B (also referred to as unit identifiers) identifying various characteristics of the lighting unit 12, a data code identifier 232C identifying, for example, the number of bits expected in the control codes for the lighting unit 12, a lighting configuration code 232D identifying the type of light distribution to be generated by the lighting unit 12, and a serial number 232E that is unique to the lighting unit 12 and thus uniquely identifies the specific lighting unit 12. The unique unit identifier 30 of each lighting unit 12 may be stored, for example, in a non-volatile memory in the circuitry of the lighting unit 12. The one or more unit characteristic identifiers 232B can include, for example, the white LED light temperature(s) 242, the number 244 of red, green and blue LEDs 24 of the LED array 26, the dimensions 246 of the lighting unit 12, such as the length of the lighting unit 12, and/or data 248 indicating a plurality of addressable lights for the lighting unit 12.

Figure 2D:
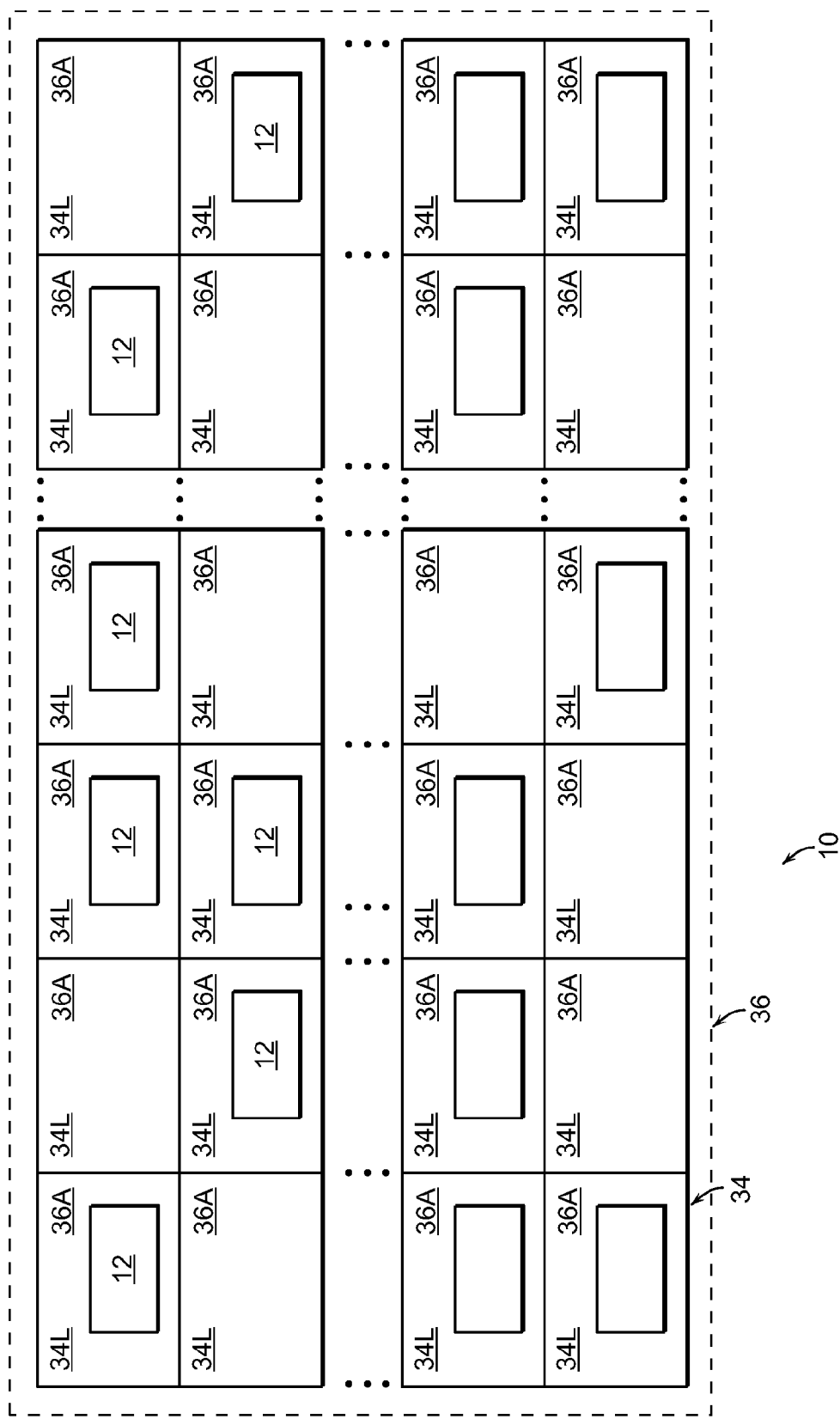
FIG. 2D is a diagrammatic block diagram of another lighting array in another exemplary address space of a display space.

Turning now to FIG. 2D, an exemplary diagrammatic representation of a lighting array 10 is shown therein. This lighting array 10 is constructed for illumination of a display space 34 wherein the display space 34 may, for example, comprise a two or a three dimensional architectural space or a volume, such as a building facade or a three dimensional indoor or outdoor space such as a courtyard, a plaza or an enclosed volume. As illustrated, and according to the present invention, the display space 34 comprises the actual or potential physical locations 34L of the lighting units 12 of FIG. 2A in the display space 34 and an array address space 36 comprising of the array addresses 36A are mapped onto or into the physical locations 34L comprising the display space 34 with each address 36A in the address space 36 representing and corresponding to a physical location 34L on or in the display space 34.

As will be described further below in further detail, a primary object and purpose of the present invention is to provide a method and a system for identifying and organizing the lighting units 12 into the display space 34 of the lighting array 12, including identifying the type, the characteristics and the address 36A of the physical location 36L of each of the lighting units 12 in the lighting array 10, and providing this information to the user and/or installer to facilitate assembly, construction, testing, operation and/or maintenance of the lighting array 10.

In some examples, FIG. 2E illustrates another exemplary diagrammatic representation of a lighting array 109 of FIG. 1 is shown therein. This lighting array 109 is constructed for illumination of a display space 234 wherein the display space 234 may, for example, includes a two or a three dimensional architectural space or a volume, such as a building facade or a three dimensional indoor or outdoor space such as a courtyard, a plaza or an enclosed volume. As illustrated, the display space 234 includes the actual or potential physical locations 234L of the lighting units 110, 120 through 190 of FIG. 1 and addressable lights in the display space 234 and an array address space 236 including of the array addresses 236A that are mapped onto or into the physical locations 234L including the display space 234 with each address 236A in the address space 236 representing and corresponding to a physical location 234L on or in the display space 234.

Figure 3B:
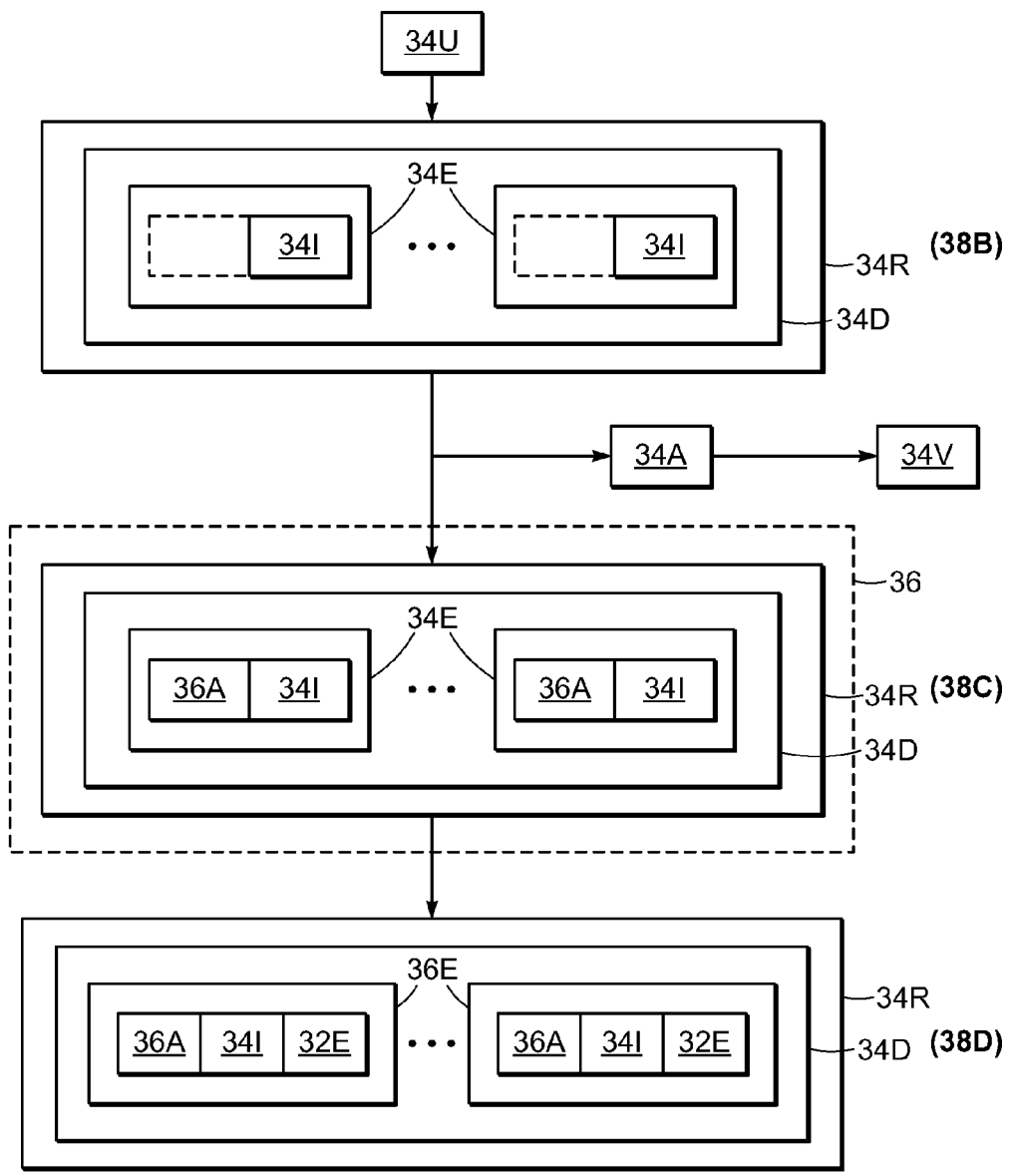
FIG. 3B is a diagrammatic flow diagram of a method for organizing and relating lighting units to a physical display space, to a display address space and unique identifiers of the lighting units.

The method and the system of the present invention are accordingly illustrated in FIGS. 3A and 3B, which is a diagrammatic flow diagram and block diagram of the elements and the operation of the present invention. As shown in FIG. 3A, the method and the system of the present invention both include a preliminary step 38A in which, at or during the final stage of manufacturing the lighting unit 12 of FIG. 2A, a unique unit identifier 30 is written into the lighting unit 12, thereby uniquely identifying each one of the lighting units 12 and specifying the characteristics of that specific lighting unit 12. As described, the unique unit identifier 30 may typically include, but not be limited to, a product code 32A identifying the type of the lighting unit 12, one or more unit characteristic identifiers 32B identifying various characteristics of the lighting unit 12 such as the white LED light temperature(s) and number of red, green and blue LEDs 24 of the LED array 26 and the dimensions of the lighting unit 12, such as the length of the lighting unit 12, a data code identifier 32C identifying, for example, the number of bits expected in the control codes for the lighting unit 12, a lighting configuration code 32D identifying the type of light distribution generated by the lighting unit 12, and a serial number 32E that is unique to the lighting unit 12 and thus uniquely identifies that specific lighting unit 12.

Turning now to FIG. 3B and steps 38B through 38D of the present invention, as shown therein, step 38B comprises the operation of relating the lighting units 12 to the physical locations 34L of a display space 34 of the proposed or the already existing lighting array 10, and relating the physical locations 34L to the corresponding addresses 36A of the array address space 36 corresponding to the proposed or the existing display space 34.

In step 38B, a user generates or otherwise provides, as an input to the system and method of the present invention, a representation 34R of the proposed or the existing lighting array 10 and the display space 34. The representation 34R generally comprises an array data structure 34D that includes a unit entry 34E for and corresponding to each lighting unit 12 in a lighting array 10 and each unit entry 34E will include an address 36A in address space 36 of each intended or existing physical location 34L of each lighting unit 12 in the proposed or the existing lighting array 10 and, for each physical location, an identification 34I of the type and characteristics of the lighting unit 12 to appear therein. As discussed above, the identification 34I of the lighting unit 12 may include, for example, one or more unit characteristic identifiers 32B identifying various characteristics of the lighting unit 12, such as the white LED light temperature(s) and number of red, green and blue LEDs 24 of the LED array 26 and the dimensions of the lighting unit 12, such as the length of the lighting unit 12.

According to present embodiments of the present invention, the array data structure 34D may comprise, for example, a database or a spreadsheet or some other suitable data structure and the array data structure 34D and unit entries 34E, comprising a representation 34R of a lighting array 12, may be generated and edited by an array modeling program 34U comprising, for example, of a database or a spreadsheet program. It will be appreciated that, as indicated above, the array data structure 34D and the unit entries 34E of the representation 34R of the lighting array 10 may be generated from the existing lighting array 10 by, for example, manually entering the identification 34I information into the data entry 34E for each lighting unit 12, or by reading the identification 34I information into the data entries 34E from another, previously constructed data structure, such as a database, a spreadsheet or some other data structure or data record.

A similar procedure may be employed to generate the unit entries 34E of a representation 34R of a new lighting array 10 by, for example, again using the array modeling program 34U to generate the array data structure 34D comprising the unit entries 34E arranged and organized to model the representation 34R of the intended lighting array 10 and entering the required identification 34I information manually or from a previously constructed data structure, such as a database, a spreadsheet or some other data structure or record.

In the instance where a new lighting array 10 is to be designed or the existing lighting array 10 is to be analyzed or modified, the system and the method may further include an array modeling program 34A, such as a graphics program having a stored library of representations of the static and dynamic light distributions to be generated by each type and configuration of lighting unit 12 that may be employed in constructing the desired lighting array 10. According to this implementation of the present invention, the array modeling program 34A may read the representation 34R, as directed by the user, and generate a visual display 34V, such as on a computer screen, of the lighting distributions and displays that may be, or are selected to be, generated by the lighting units 12 of the lighting array 10, thereby providing a visual modeling and illustration of the lighting array 10 during design of the lighting array 10. It should be noted that the data structures associated with the array modeling program may further include a displayable visual representation 34 of the modeled display space 34, such as displayable representation 34S of the building facade or the three dimensional indoor or outdoor space, such as the courtyard, the plaza or the enclosed volume, to provide a more realistic rendition of the possible final appearance of the lighting array 10.

In step 38C, the representation 36R is mapped onto the address space 36 which, as described, contains the address 36A of each physical location 36L of a lighting unit 12 in the lighting array 10, thereby relating the physical lighting array 10 and the lighting units 12 thereof as represented in the representation 36R to the array address space 36 and each lighting unit 12 to the corresponding address 36A in address space 36. After completion of step 38C, the unit entry 34E for and corresponding to each lighting unit 12 in the lighting array 10 will therefore, as discussed above, include the address 36A corresponding to and identifying the physical location 34L of the corresponding lighting unit 12 and the identification 34I of the type and the characteristics of the lighting unit 12 to appear therein.

With regard to step 38C, it should be noted that address space 36 may, in certain implementations, include the addresses 36A for both actual and potential physical locations of the lighting unit 12 in the display space 34, so that the address space 36 addresses 36A essentially map one on one to each possible lighting unit 12 physical location 34L in the display space 34. This method of relating the address space 36 to the display space 34 and the representation 36R may be preferable, for example, when the existing lighting array 10 is being modified or the new lighting array 10 is being created as the number of physical locations 34L in the display space 34 and thus the number and arrangement of the addresses 36A required in the address space 36 may change during the creation or modification of the lighting array 10.

When the number and locations of the physical locations 34L of lighting units 12 are known, however, such as when the lighting array 10 has already been designed or is already in existence, it may be preferable to generate and assign the addresses 36A only to the physical locations 34L actually containing lighting units 12. In such instances, the number of the addresses 36A may be significantly reduced and the addresses 36A may be generated and assigned, for example, according to any convenient scheme, such as in sequence or by row and column, and so on.

Turning now to step 38D, this is a serialization step where a specific lighting unit 12 is associated with each physical location 34L of the lighting unit 12 in the display space 34 by identifying, for each physical location 34L, either the lighting unit 12 already residing at or for illumination of the physical location 34L or the lighting unit 12 having the characteristics identified in the corresponding unit entry 34E of the representation 34R of the lighting array 10. As described above, and according to the present invention, each lighting unit 12 is uniquely identified by the unique unit identifier 30 stored in or in permanent association with the lighting unit 12. As described, the unique unit identifier 30 includes the data fields 32 identifying, for example, the characteristics of the lighting unit 12, such as a product code 32A identifying the type of lighting unit 12, one or more unit characteristic identifiers 32B identifying various characteristics of the lighting unit 12, such as the white LED light temperature(s) and number of red, green and blue LEDs 24 of the LED array 26 and the dimensions of the lighting unit 12, such as the length of the lighting unit 12, the data code identifier 32C identifying, for example, the number of bits expected in the control codes for the lighting unit 12, and the lighting configuration code 32D identifying the type of light distribution to be generated by the lighting unit 12.

As discussed above, these data fields 32 are at this point in the process already identified and written into the unit entries 34E of the representation 34R, as are the address 36A in the address space 36 of the lighting unit 12, thus identifying the physical location 34L of the lighting unit 12. The identification of a specific lighting unit 12 that resides at the given physical location 34L or that is selected to be installed at the given physical location 34L is, therefore, completed by the identification of and the addition, to each unit entry 34E, of the unique serial number 32E that is permanently assigned to the corresponding installed lighting unit 12 or to the lighting unit 12 that has been selected to be installed at that physical location 34L, thereby completing the serialization process.

In present embodiments of the present invention, as described above, the array modeling program 34U or some other program of suitable functionality used to generate and edit the array data structure 34D and the unit entries 34E of the representation 34R of the lighting array 10 may also be used for the serialization process, that is, for the addition of the unique serial number 32E of the corresponding lighting unit 12 to each unit entry 34E of the array data structure 34D.

In the case of the existing lighting array 10, the serial number 32E and other data fields 32 of each lighting unit 12 of the lighting array 12 may be obtained, for serialization step 38D, from existing electronic or physical records 38A, for example, such as an electronic or a hard copy database, a spreadsheet or a tabulation, or read from the lighting units 12 by, for example, interrogation of the installed lighting units 12 by the array control system 14. In other implementations of the present invention, the unique unit identifier 30 of each lighting unit 12 may also or alternately be stored in the lighting unit 12 in, for example, a radio frequency identifier (RFID) chip 22C and read remotely or by a hand-held unit.

In the case of a new lighting array 10, the lighting units 12 will typically be available from inventory comprising, for example, a shipment or a stock room or a warehouse of suitable lighting units 12, and the serial number 32E and other data fields 32 of each lighting unit 12 of the lighting array 12 may be obtained, for serialization step 38D, from the inventory data 38B comprising, for example, an electronic or a hard copy database, a spreadsheet, a bill of lading or some other tabulation or documentation accompanying the lighting units 12 or read from the associated RFID chips 22C attached to each one of the lighting units 12. In the case when the lighting units 12, for some or all of the physical locations 34I of the display space 34, are to be selected from an inventory, the array management system 14 may, for example, interrogate the inventory data 38 or the RFID chips 22C, associated with the individual lighting units 12 in the inventory, read the data fields 32 corresponding to the individual lighting units 12 to determine, for example, the characteristics of each available lighting unit 12, that is, and for example, the product code 32A, the unit characteristic identifiers 32B, the data code identifier 32C and the lighting configuration code 32D. The array management system 14 may then compare the data fields 32 of the available lighting units 12 with the characteristics specified for a given physical location 34L of the lighting array 10 and identify the unique serial numbers 32E of the lighting units 12 available in the inventory. The array management system 14, or a user controlling the array management system 14, may then select a suitable lighting unit 12 having characteristics matching those of the physical location 34L, whereupon the unique serial number 32E of the selected lighting unit 12 will be then written into the corresponding data field 32 of the unit entry 34E corresponding to the physical location 34L, thus assigning that lighting unit 12 to that physical location 34L.

This process will be repeated for each open or unassigned physical location 34L, with the unique serial numbers 32E of the selected lighting units 12 being written into the unit entries 34E of the representation 34.

The unit entries 34E of the array data structure 34D, comprising the representation 34R of the lighting array 10, will then contain the complete and unique unit identifier 30, including the unique serial number 32E, the lighting characteristic data fields 32 and the physical location address 36A, of each lighting unit 12 in the lighting array 10.

In summary, therefore, and as described, there is a unit entry 34E corresponding to each lighting unit 12 in the lighting array 10 and, as described, each unit entry 34E contains information identifying the physical location 34L, that is, the address 36A, of each lighting unit 12 in the array 10, the unique identification of each lighting unit 12, in the unique serial number 32E of the lighting unit 12, and the complete specification of the type and characteristics of each such lighting unit 12, in the data fields 32 of the unit entries 34E.

The unit entries 34E of the array data structure 34D of the lighting array management system 14 thereby provide the necessary information to efficiently plan, manage and control the construction, the modification and/or the repair of a lighting array 10 by uniquely identifying each lighting unit 12 in the array 10, including the unique identification of and the location and the characteristics of each of the lighting units 12. This information may then be used, for example, when designing and constructing a new lighting array 10 and/or modifying an existing lighting array 10 to select the individual lighting units 12 to be installed, including planning the order in which the lighting units 12 are to be installed, and to identify and locate the lighting units 12 from an inventory or to be ordered. In the case of any repair to an existing lighting array 10, the information stored in the array data structure 34D maybe used to identify the specific lighting units 12 to be repaired or replaced, including their location in the lighting array 12 and in the display space 34, their unique identifying serial numbers 32E, and their characteristics as described in data fields 32, thereby insuring that the replacement lighting units 12 have the appropriate characteristics and thereby provide the same illumination as the original design, or possible may be altered to provide an improved illumination effect. This information may be employed by a monitoring and test facility implemented, for example, as a program in the array management system 14 to execute one or more test routines directed at the individual lighting units 12 with the routines accessing the unit entries 34E.

In addition to providing the information necessary to efficiently plan and manage the installation of lighting units 12, the array management system 14 provides an efficient means to monitor and test the lighting units 12 of a lighting array 10 through monitoring and test functions implemented, for example, as a program or programs in array management system 14. That is, and for example, monitoring and test functions will read the unit entries 34E corresponding to lighting units 12 to be tested, either selected individually, such as by a user, or in a specified order. Monitoring and test functions will determine from the unit entries 34E, and for each lighting unit 12 to be tested, the unique identification 32E, the physical location address 36A and the functional characteristics of the lighting unit 12 as specified in the data fields 32 and will generate and transmit to each lighting unit 12 the appropriate corresponding commands 14C to exercise the functional characteristics of the lighting unit 12. The responses of the lighting units 12 to the test and monitoring commands 14C may, depending on the implementations of the lighting units 12, be transmitted to the array management system 14 to generate a report of the test results, or may, for example, be observed directly by a user, possible with the assistance of a concurrent display of the lighting array functions generated by an array modeling program 34A. The results of the tests may then be used, as necessary, for the maintenance of the lighting array 10.

Figure 4:
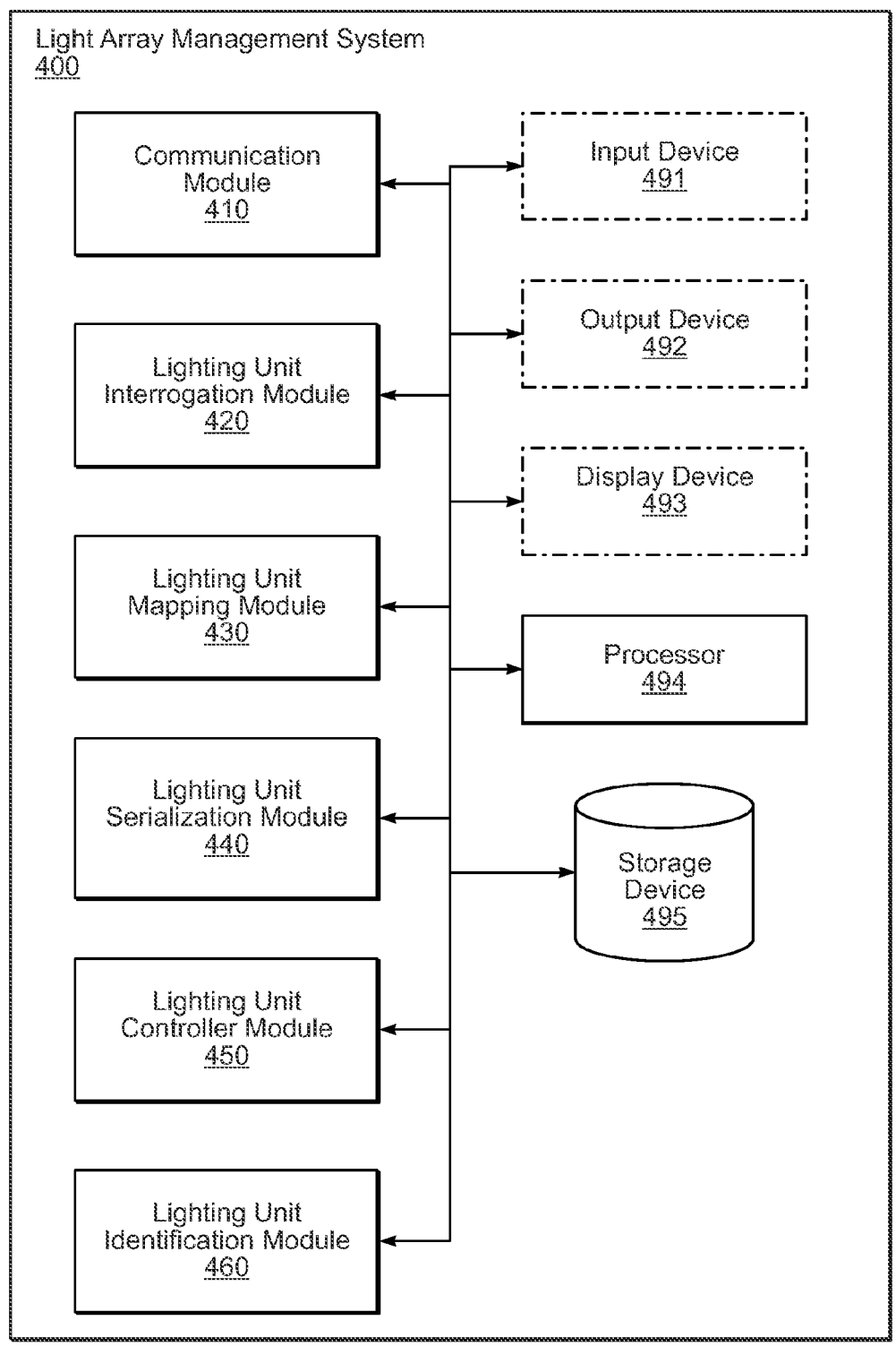
FIG. 4 is a diagrammatic block diagram of an exemplary light array management system.

FIG. 4 is a diagrammatic block diagram of an exemplary light array management system 400. The light array management system 400 includes a communication module 410, a lighting unit interrogation module 420, a lighting unit mapping module 430, a lighting unit serialization module 440, a lighting unit controller module 450, a lighting unit identification module 460, an input device 491, an output device 492, a display device 493, a processor 494, and a storage device 495. The input device 491, the output device 492, and the display device 493 are optional components of the light array management system 400. The modules and devices described herein can, for example, utilize the processor 494 to execute computer executable instructions and/or the modules and devices described herein can, for example, include their own processor to execute computer executable instructions (e.g., an encryption processing unit, a field programmable gate array processing unit). It should be understood the light array management system 400 can include, for example, other modules, devices, and/or processors known in the art and/or varieties of the illustrated modules, devices, and/or processors.

The communication module 410 receives unit identifiers from a controller of the lighting unit and forwards the unit identifiers to the lighting unit interrogation module 420. The communication module 410 can also transmit and/or receive other information associated with the light array management system 400.

The lighting unit interrogation module 420 receives unit identifiers from a plurality of lighting units 110, 120 through 190 of FIG. 1. Each unit identifier includes data (e.g., ten addressable lights, twenty addressable lights, etc) indicating a plurality of addressable lights for the respective lighting unit. The data includes a number of addressable lights controlled by the controller in the respective lighting unit and enables the light array management system 400 to automatically identify the plurality of addressable lights for finite control of the lights within a lighting unit. The finite identification and control of the lights within the lighting unit advantageously decreases the cost to provision and control the lighting array.

The lighting unit mapping module 430 sequentially maps the data of the addressable lights for each of the plurality of lighting units to an array address space. The sequentially mapping of the data can create an initial listing of the available addressable lights and can automatically number the available addressable lights in each lighting unit. For example, a lighting unit with twenty addressable lights is mapped to twenty entries within the array address space. The sequentially mapping of the data into the array address space enables an automatic assignment of addresses to the addressable lights, thereby decreasing the time and cost for provisioning and mapping the light array.

In some examples, the lighting unit mapping module 430 assigns sequential addresses to the addressable lights for each of the plurality of lighting units in the array address space (e.g., assigns addresses 1, 2, 3, etc. to the addressable lights; randomly assigns addresses to the addressable lights, etc.). In other examples, the lighting unit mapping module 430 sequentially orders the assigned sequential addresses of the addressable lights for each of the plurality of lighting units in the array address space (e.g., modifies the order of the addressable lights to put the addressable lights in sequential order, changes an ordering assignment of the addressable lights, etc.).

The lighting unit serialization module 440 serializes the array address space for the plurality of lighting units based on the sequentially mapping of the data of the addressable lights and a specific location of each of the lighting units. The serialization generates an array address space that corresponds to the physical layout of the lighting array. For example, the serialization can order the addressable lights in a representation of an outside wall of a building. In another example, the serialization can arrange the addressable lights in a 3-dimensional array that represents of an interior multi-floor building. In some examples, the specific location of each of the lighting units includes a physical location of the respective lighting unit in a structure (e.g., addressable light B12 is located next to door AB23 on the fourth floor of the building, addressable light C24 is located next to a painting on the fifth floor of the building, etc.).

The lighting unit controller module 450 transmits a control command to a controller of one of the plurality of lighting units. In some examples, the lighting unit controller module 450 communicates the control command to the communication module 410 and the communication module 410 transmits the control command to the controller. The control command includes a command code to operate one or more of the addressable lights of the one of the plurality of lighting units. In other words, the lighting unit controller module 450 can provide individualized control of individual lights utilizing the array address space, thereby increasing the functional uses of the light array by decreasing the cost and time to control the individual lights.

The lighting unit identification module 460 associates a unique unit identifier for each of the plurality of lighting units in the array address space (e.g., randomly assigned identifier is assigned to each addressable light, pre-defined identifier is associated with each addressable light, etc.). The unique unit identifier includes a product code identifying a type of the lighting unit, at least one identifier of at least one light emission characteristic of the lighting unit, at least one dimension of the lighting unit, an identifier of control codes for the lighting unit, and/or a lighting configuration code identifying a type of light distribution generated by the lighting unit.

The input device 491 receives information associated with the computing device 410 from a user (not shown) and/or another computing system (not shown). The input device 491 can include, for example, a keyboard and/or a scanner. The output device 492 outputs information associated with the computing device 410 (e.g., information to a printer (not shown), information to a speaker).

The display device 493 displays information associated with the computing device 410 (e.g., status information, call information, graphical representation). The processor 494 executes the operating system and/or any other computer executable instructions for the computing device 410 (e.g., executes applications).

The storage device 495 stores call information and/or call configuration. The storage device 495 can include a plurality of storage devices and/or the computing device 410 can include a plurality of storage devices (e.g., a call configuration storage device, a voice storage device). The storage device 495 can include, for example, long-term storage (e.g., a hard drive, a tape storage device, flash memory), short-term storage (e.g., a random access memory, a graphics memory), and/or any other type of computer readable storage.

Figure 5:
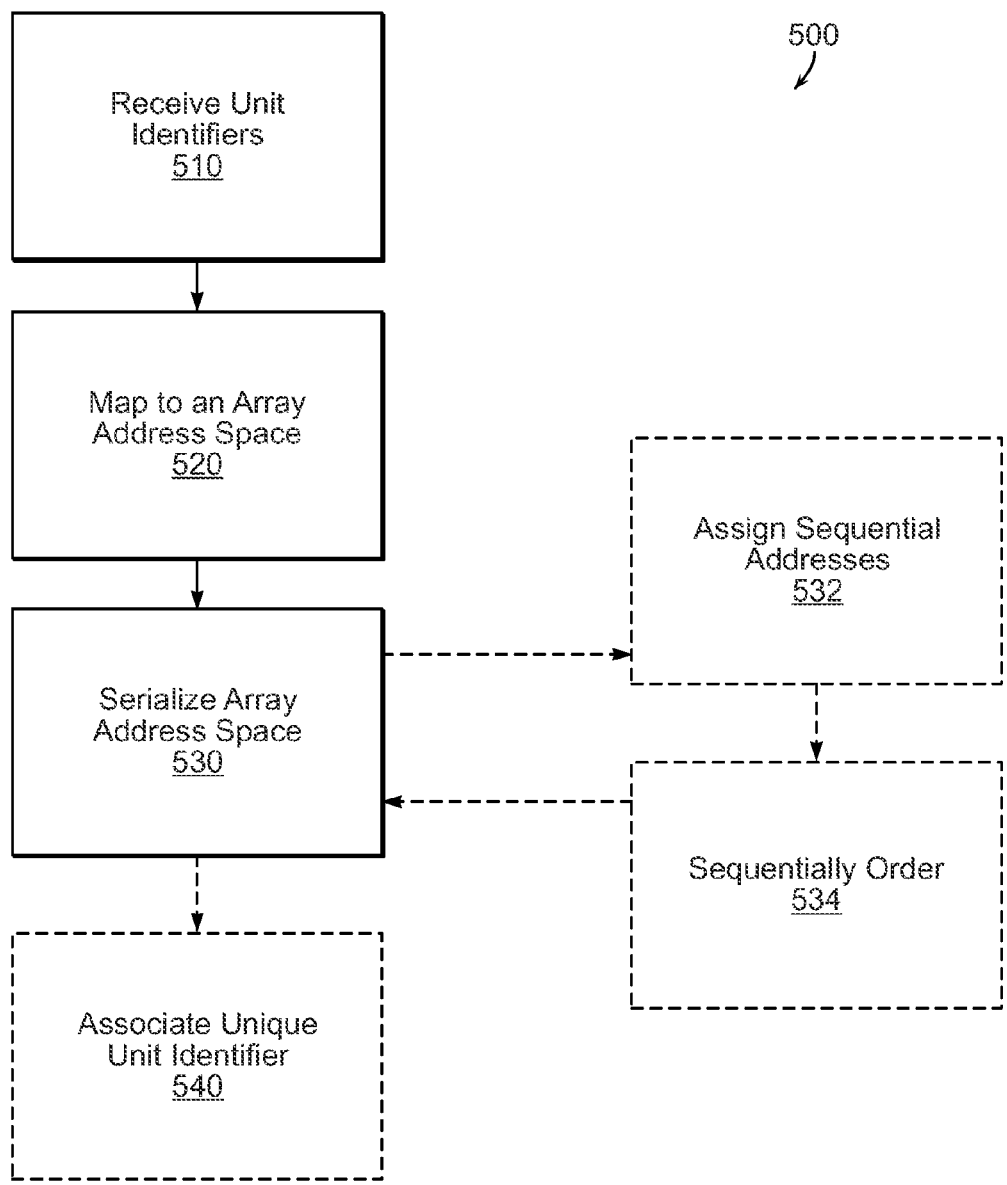
FIG. 5 is a diagrammatic flow diagram of a method for light array management.

FIG. 5 is a diagrammatic flow diagram of a method 500 for light array management utilizing, for example, the light array management system 400 of FIG. 4. The lighting unit interrogation module 420 receives (510) unit identifiers from a plurality of lighting units. Each unit identifier includes data indicating a plurality of addressable lights for the respective lighting unit. The lighting unit mapping module 430 sequentially maps (520) the data of the addressable lights for each of the plurality of lighting units to an array address space. The lighting unit serialization module 440 serializes (530) the array address space for the plurality of lighting units based on the sequentially mapping of the data of the addressable lights and a specific location of each of the lighting units.

In some examples, the lighting unit interrogation module 420 receives (510) unit identifier from a controller of each of the plurality of lighting units. In other examples, the lighting unit controller module 450 transmits a control command to a controller of one of the plurality of lighting units. The control command includes a command code to operate one or more of the addressable lights of the one of the plurality of lighting units. In some examples, the specific location of each of the lighting units includes a physical location of the respective lighting unit in a structure.

In other examples, the lighting unit serialization module assigns (532) sequential addresses to the addressable lights for each of the plurality of lighting units in the array address space. In some examples, the lighting unit serialization module sequentially orders (534) the assigned sequential addresses of the addressable lights for each of the plurality of lighting units in the array address space. In other examples, the lighting unit identification module 460 associates (540) a unique unit identifier for each of the plurality of lighting units in the array address space.

Since certain changes may be made in the above described method and system for planning, installing, managing and controlling an array of high power light emitting diodes, without departing from the spirit and scope of the invention herein involved, it is intended that all of the subject matter of the above description or shown in the accompanying drawings shall be interpreted merely as examples illustrating the inventive concept herein and shall not be construed as limiting the invention.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by special purpose logic circuitry and/or an apparatus can be implemented on special purpose logic circuitry. The circuitry can, for example, be a FPGA (field programmable gate array) and/or an ASIC (application specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from, and/or can transfer data to one or more mass storage devices for storing data (e.g., magnetic, magneto-optical disks, optical disks, etc.).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The components of the system can be interconnected by any form or medium of digital data communication (e.g., a communication network). Examples of communication networks include a local area network (LAN), a wide area network (WAN), the Internet, wired networks, and/or wireless networks. The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A light array management system comprising:
a lighting unit interrogation module configured to receive unit identifiers from a plurality of lighting units, wherein each unit identifier comprises data indicating a plurality of addressable lights for the respective lighting unit and at least a length of the lighting unit;
a lighting unit mapping module configured to sequentially map the data of the addressable lights for each of the plurality of lighting units to an array address space based on at least the length of the lighting unit; and
a lighting unit serialization module configured to serialize the array address space for the plurality of lighting units based on the sequentially mapping of the data of the addressable lights and a specific location of each of the lighting units.

2. The system of claim 1, wherein each unit identifier is received from a controller of the lighting unit.

3. The system of claim 1, further comprising a lighting unit controller module configured to transmit a control command to a controller of one of the plurality of lighting units, wherein the control command comprises a command code to operate one or more of the addressable lights of the one of the plurality of lighting units.

4. The system of claim 1, wherein the specific location of each of the lighting units comprises a physical location of the respective lighting unit in a structure.

5. The system of claim 1, wherein the lighting unit mapping module is further configured to:
assign sequential addresses to the addressable lights for each of the plurality of lighting units in the array address space; and
sequentially order the assigned sequential addresses of the addressable lights for each of the plurality of lighting units in the array address space.

6. The system of claim 1, further comprising a lighting unit identification module configured to associate a unique unit identifier for each of the plurality of lighting units in the array address space.

7. The system of claim 1, wherein the unit identifier further comprises a product code identifying a type of the lighting unit.

8. A lighting unit comprising:
a plurality of addressable lights; and
a controller configured to:
transmit a unit identifier to a light array management system, wherein the unit identifier comprises data indicating a plurality of addressable lights for the lighting unit and at least a length of the lighting unit, and
control one or more of the plurality of addressable lights based on a control command received from the light array management system, wherein the control command comprises a command code to operate the one or more of the plurality of addressable lights.

9. A light array management method comprising:
receiving unit identifiers from a plurality of lighting units, wherein each unit identifier comprises data indicating a plurality of addressable lights for the respective lighting unit and at least a length of the lighting unit;
sequentially mapping the data of the addressable lights for each of the plurality of lighting units to an array address space based on at least the length of the lighting unit; and
serializing the array address space for the plurality of lighting units based on the sequentially mapping of the data of the addressable lights and a specific location of each of the lighting units.

10. The method of claim 9, further comprising receiving unit identifier from a controller of each of the plurality of lighting units.

11. The method of claim 9, further comprising transmitting a control command to a controller of one of the plurality of lighting units, wherein the control command comprises a command code to operate one or more of the addressable lights of the one of the plurality of lighting units.

12. The method of claim 9, wherein the specific location of each of the lighting units comprises a physical location of the respective lighting unit in a structure.

13. The method of claim 9, further comprising:
assigning sequential addresses to the addressable lights for each of the plurality of lighting units in the array address space; and
sequentially ordering the assigned sequential addresses of the addressable lights for each of the plurality of lighting units in the array address space.

14. The method of claim 9, further comprising associating a unique unit identifier for each of the plurality of lighting units in the array address space.

15. The method of claim 9, wherein the unit identifier further comprises a product code identifying a type of the lighting unit, an identifier of control codes for the lighting unit, or a combination thereof.

16. The system of claim 1, wherein the unique unit identifier further comprises an identifier of a light emission characteristic of the lighting unit.

17. The system of claim 1, wherein the unit identifier further comprises an identifier of control codes for the lighting unit.

18. The system of claim 1, wherein the unit identifier further comprises a lighting configuration code identifying a type of light distribution generated by the lighting unit.

19. The method of claim 9, wherein the unit identifier further comprises an identifier of a light emission characteristic of the lighting unit.

20. The method of claim 9, wherein the unit identifier further comprises a lighting configuration code identifying a type of light distribution generated by the lighting unit.

\* \* \* \* \*